Aug. 19, 1969  W. A. ECKERLE  3,461,906
HOSE STORAGE SYSTEM FOR WASHING APPLIANCE

Filed Aug. 18, 1966  2 Sheets-Sheet 1

INVENTOR.
WILLIAM A. ECKERLE
BY James E. Espe
HIS ATTORNEY

Aug. 19, 1969  W. A. ECKERLE  3,461,906
HOSE STORAGE SYSTEM FOR WASHING APPLIANCE
Filed Aug. 18, 1966  2 Sheets-Sheet 2

INVENTOR
WILLIAM A. ECKERLE
BY James E. Espe
HIS ATTORNEY

United States Patent Office

3,461,906
Patented Aug. 19, 1969

3,461,906
HOSE STORAGE SYSTEM FOR WASHING APPLIANCE
William A. Eckerle, Louisville, Ky., assignor to General Electric Company, a corporation of New York
Filed Aug. 18, 1966, Ser. No. 573,398
Int. Cl. B65h 75/46, 75/48
U.S. Cl. 137—355.17           14 Claims

ABSTRACT OF THE DISCLOSURE

An improved storage system for the water inlet hose and/or the effluent discharge hose of a washing appliance, such as a portable dishwasher. One aspect of the invention provides improved means for facilitating the retraction of the hose into its storage compartment. A portion of the hose is secured against movement relative to the compartment, and the hose also has a major portion extending from the securing means to a terminal end that is free to move relative to the compartment and through an opening provided in one wall of the compartment. The hose major portion forms a loop within the compartment that is substantially tangential to the one wall of the compartment and thus urges the hose to retract itself through the opening and into the compartment. Another aspect of the invention provides improved means to minimize kinking of the hose during its withdrawal from the storage compartment. The hose has a first portion secured against movement and a second portion in the form of a loop movable relative to the first portion, and a generally cylindrical element is secured to the hose second portion, positioned within the loop, for movement both with and relative to the hose second portion.

---

This invention relates generally to washing appliances and, more specifically, to a storage system for the water inlet hose and/or the effluent discharge hose of a washing appliance.

Although the present invention is not necessarily limited in its application thereto, it is particularly useful with a portable washing appliance such as, for example, a portable automatic dishwasher, wherein the water inlet hose and the effluent discharge hose must be frequently withdrawn from and inserted into a storage chamber within the appliance cabinet. Such hoses, and particularly those used for water inlet purpose, must have walls of sufficient thickness and strength to withstand normal household water pressures. Thus the hoses are usually heavy and cumbersome for a petite housewife to maneuver. The withdrawal of the hose from the storage compartment is usually not difficult since this only involves overcoming the weight of the hose and normal frictional engagement between the hose and the adjacent walls of the compartment. However, reinserting the hose into the compartment is frequently more difficult because, unlike withdrawal where tension is placed on the hose and it is "snaked" out, the flexible hose is placed in compression and, in effect, is "stuffed" into the compartment. With arrangements heretofore available, the hose would seldom seek its normal postion within the compartment without diligent urging by the operator.

Of course, this problem could be overcome by providing a retracting mechanism employing such devices as springs or counterbalance weights but these devices are expensive and significantly increase the cost of the appliance. Moreover, they are subject to wear and resulting malfunction. This problem is especially acute when the storage compartment is generally horizontally disposed, i.e., where the hose is moved horizontally into the compartment, since gravity does not provide assistance as in those installations wherein the hose is inserted downwardly into a vertically disposed compartment.

Thus, it would be advantageous to provide an improved, relatively inexpensive hose storage system for a washing appliance which would facilitate insertion of the hose into a storage chamber and particularly with respect to a horizontally disposed compartment.

Another problem encountered with hose manipulation is that of kinking the hose by excessively withdrawing it from the storage compartment. Frequently the kinking occurs within the compartment where it goes unnoticed by the operator of the appliance. Kinking, of course, provides a substantial restriction against liquid flow through the hose and this could create malfunction of the washing appliance.

Accordingly, it would be desirable to provide inexpensive, simple means to minimize kinking of a washing appliance hose due to excessive withdrawal from its storage compartment.

It is an object of this invention to provide an improved hose storage system for a washing appliance.

It is another object of this invention to provide an improved hose storage system which utilizes a generally horizontally disposed storage compartment but which allows reasonably convenient insertion of the hose into the compartment.

It is a further object of this invention to provide an inexpensive, simple means to minimize kinking of a washing appliance hose which may otherwise occur due to excessive withdrawal from its storage compartment.

Briefly stated, in accordance with one aspect of the present invention, there is provided a hose storage system for a washing appliance comprising a compartment having at least one opening in at least one wall thereof. At least one hose is adapted to be at least partially inserted into and partially withdrawn from the compartment through the opening. Means are provided to secure a portion of the hose against movement relative to the compartment. The hose has a major portion extending from the securing means to a terminal end which is free to move relative to the compartment. The major portion forms a loop within the compartment and the loop is substantially tangential to one wall of the compartment when the hose is inserted into the compartment whereby the resiliency of the hose tends to urge the hose into a large loop within the compartment.

In accordance with another aspect of the present invention, there is provided, in a hose system comprising at least one hose having a first portion secured against movement and a second portion in the form of a loop movable relative to the first position, a generally cylindrical element secured to the second portion, for movement therewith, and positioned within the loop.

While the specification concludes with claims particularly pointing out and distinctly claiming the subject matter which is regarded as the invention, it is believed the invention will be better understood from the following description taken in connection with the accompanying drawings, in which:

Figure 1:
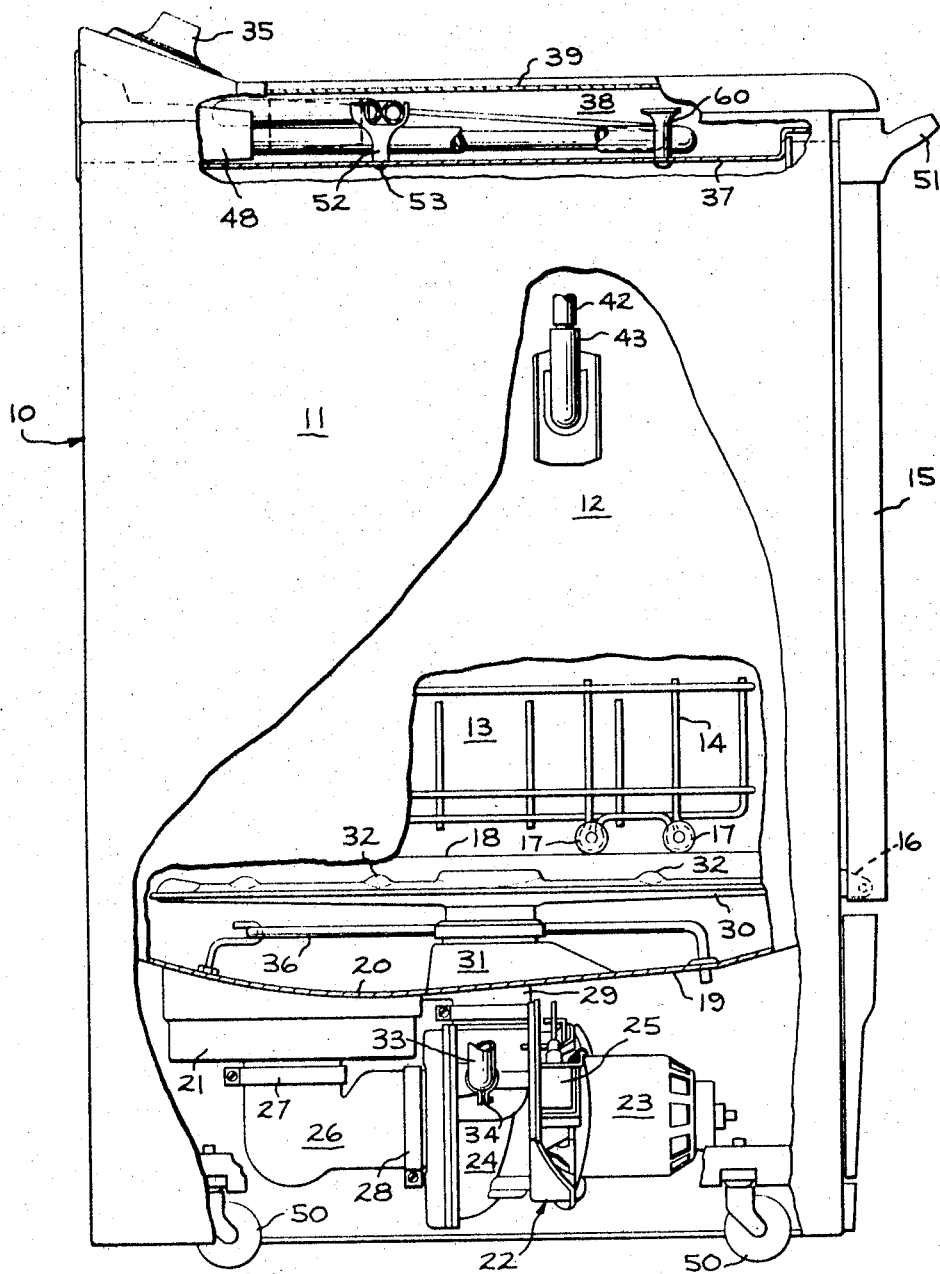
FIGURE 1 is an elevational view, partially cut away to show details, of a washing appliance utilizing the present invention.

Referring now to the drawings, and particularly to FIGURE 1 thereof, there is illustrated a washing appliance in the form of an automatic dishwasher 10 having an outer cabinet 11 and an inner cabinet 12. Inner cabinet 12 defines therein a wash chamber 13 which contains at least one dish-supporting rack 14. Rack 14 is adapted to receive and support articles to be washed within wash chamber 13. A closure member or door 15 is pivotal about a substantially horizontally axis defined by a pair of hinges 16, only one of which is visible in FIGURE 1. Door 15 provides access to wash chamber 13 so that articles may be inserted into or removed from rack 14. In order to facilitate loading and unloading of rack 14, the rack is provided with a plurality of rollers 17 which rest upon a track 18 formed in the side walls of inner cabinet 12. When door 15 is pivoted to its substantially horizontal open position, a track on the inner surface of door 15 (not shown) aligns itself with track 18 so that rack 14 may be at least partially withdrawn from wash chamber 13 onto the opened door.

The lower extremely of wash chamber 13 is defined by a bottom wall 19 which gradually slopes to a low point 20. Disposed adjacent low point 20 is a sump 21 within which fluids will collect. Disposed below, and supported by, bottom wall 19 is a motor-pump assembly 22 which includes an electric motor 23, pump 24 and an electrically-operated valve 25. Sump 21 and the inlet of pump 24 is interconnected by a large diameter conduit 26. Conduit 26 is secured to sump 21 by means of a clamp 27 and to the housing of pump 24 by means of a clamp 28. Pump 24 has a main outlet communicating with a conduit 29 which in turn communicates with a rotatable, reaction-type spray arm 30. Spray arm 30 is rotatably mounted atop a pedestal 31 formed in bottom wall 20. Moreover, spray arm 30 is provided with a plurality of orifices 32 which open upwardly to effectuate a wash action within chamber 13 when wash fluid is forceably ejected therethrough. Some of the orifices 32 are angled so that the reaction force of the fluid issuing therethrough exerts a rotary force upon spray arm 30 causing spray arm 30 to rotate about pedestal 31.

Pump 24 is also provided with an effluent discharge outlet communicating with a conduit or hose 33 which is secured to the housing of pump 24 by means of a clamp 34. Valve 25 includes an element within the housing of pump 24 movable between two positions. In one of these positions, the element closes the effluent discharge outlet and opens the main outlet and, in the other of these positions, it closes the main outlet and opens the effluent discharge outlet.

A sequence control means (not shown) is provided to control the electrical components of dishwasher 10 in a predetermined sequence of operations which comprise an operational cycle of the dishwasher. A manually-operable control knob 35 is provided so that the operator of the dishwasher may manually initiate energization of the sequence control means. The sequence control means may comprise a conventional arrangement, well known in the washing appliance art, including a plurality of cam operated switches, a plurality of cams to operate the switches and a synchronous electric motor to drive the cams. Since such arrangement is well known in the washing appliance art, it is not shown in the drawings, and will not be discussed in detail. The sequence control means is programmed to electrically energize motor 23 and valve 25 at the appropriate times so that wash fluid will be recirculated through wash chamber 13 by means of spray arm 30 and, upon termination of the individual wash and rinse operations, the fluid will be conveyed out through effluent discharge hose 33. An electrical resistance heating element 36 may be provided in the lower portion of chamber 13 to facilitate drying of articles supported by rack 14 upon completion of the wash and rinse operations, or to heat the wash fluids within chamber 13.

Figure 2:
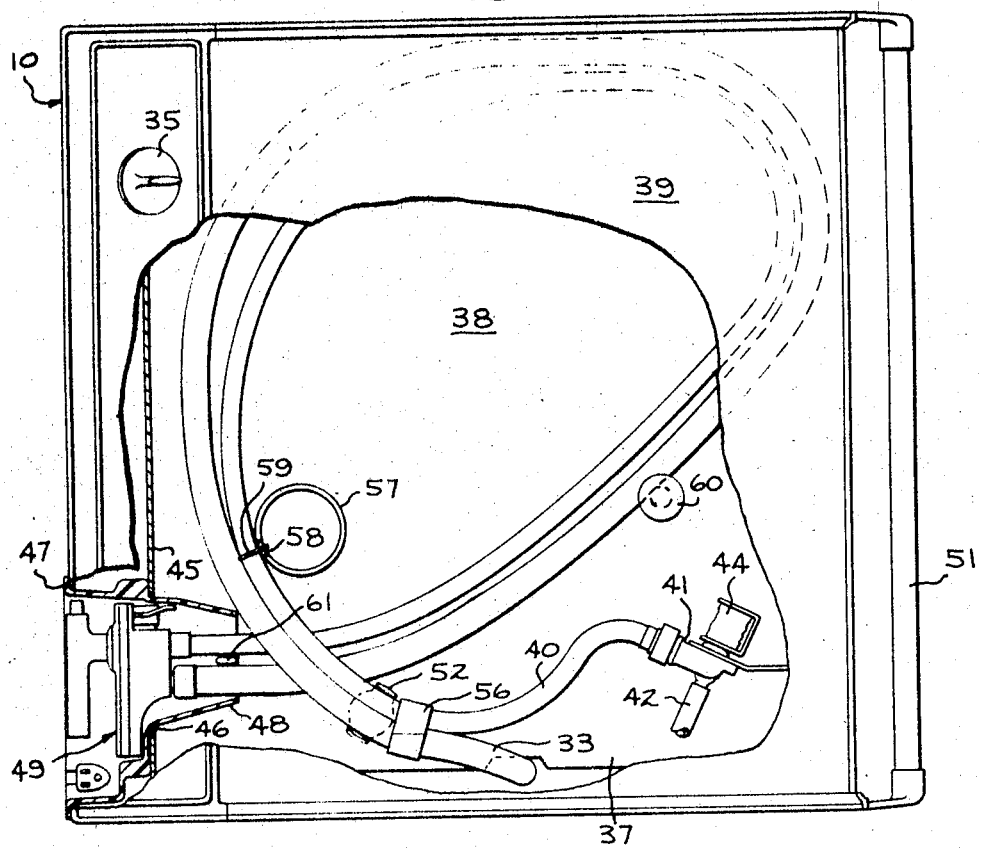
FIGURE 2 is a top view, partially cut away to show details, of the washing appliance of FIGURE 1.

The upper extremity of wash chamber 13 is defined by a wall 37 which also serves to define the lower extremity of a hose storage compartment 38. The upper extremity of compartment 38 is defined by a wall 39 which also serves as the upper appearance surface of outer cabinet 11 and may be used as a work surface by the housewife. Compartment 38 is adapted to receive and store effluent discharge hose 33 and a water inlet hose 40. Hose 33 extends upwardly from its connection with pump 24 between outer cabinet 11 and inner cabinet 12 into storage compartment 38. As illustrated in FIGURE 2, water inlet hose 40 communicates with a water inlet valve 41 disposed within compartment 38 and having connected thereto a conduit 42 which extends downwardly between outer cabinet 11 and inner cabinet 12 to terminate at a fill funnel 43 (FIGURE 1). Fill funnel 43 communications directly with wash chamber 13 whereby water admitted to conduit 42, by valve 41, is directly conveyed into wash chamber 13. Valve 41 includes a solenoid 44 which is controlled by the sequence control means.

One wall 45 of compartment 38 has an opening 46 therein through which hoses 33 and 40 may be at least partially inserted into, and partially withdrawn from, compartment 38. A member 47 is provided to span the gap between the rear wall of outer cabinet 11 and wall 45 to provide a better appearance at the rear of dishwasher 10. Member 47 has a portion 48 which extends through opening 46 and serves as a guide in a manner to be more fully discussed hereinafter. Member 47 further serves as a receptacle for a connector 49. Connector 49 serves to connect water inlet hose 40 in communication with a normal kitchen faucet and also to position the open end of effluent discharge hose 33 over the kitchen sink so that wash fluids discharged from dishwasher 10 will be directed into the sink and then into the normal household sewer system. Connector 49 may be of the type disclosed and claimed in patent application Ser. No. 357,721, filed Apr. 6, 1964 by Norman L. Kendt and Don E. Payton, entitled "Water Takeoff For Washing Machine Connector," and now U.S. Patent No. 3,306,319, issued Feb. 28, 1967, and assigned to the General Electric Company, assignee of the present invention. Since the exact construction of connector 49 is not critical to the present invention, and since it is fully disclosed in the aforementioned patent application, it will not be described in detail herein.

Figure 3:
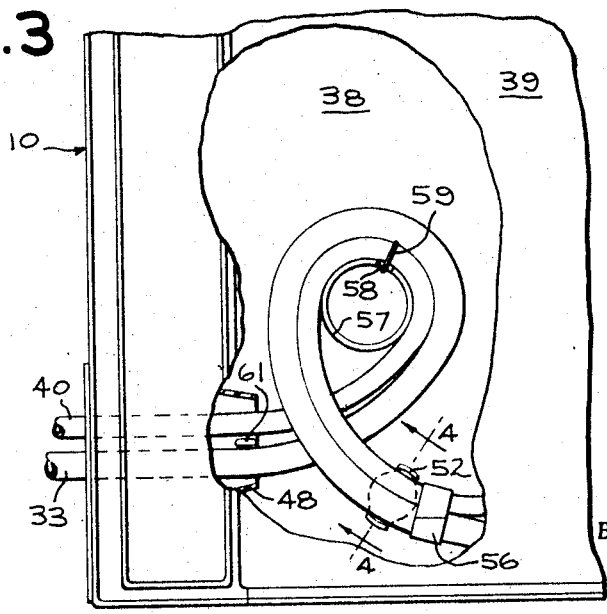
FIGURE 3 is a fragmentary view similar to FIGURE 2 but showing the hoses withdrawn from the storage compartment.

As mentioned above, dishwasher 10 is of the portable variety wherein it is provided with rollers 50 so as to be movable to and from the kitchen sink. A handle 51 is provided at the top of door 15 to facilitate movement of dishwasher 10 when door 15 is latched in the closed position. When dishwasher 10 is moved to a location adjacent the kitchen sink, connector 49 is removed from the location illustrated in FIGURE 2 and connected to the kitchen faucet. As connector 49 is withdrawn from member 47, repending upon the distance between the dishwasher and the kitchen faucet, hoses 33 and 40 may be withdrawn from compartment 38 to the extent illustrated in FIGURE 3.

Figure 4:
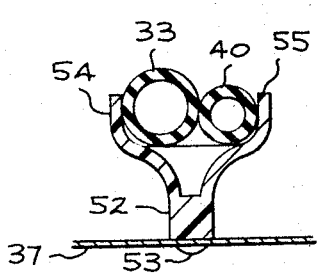
FIGURE 4 is a sectional view of the preferred form of one element of the present invention taken along line 4—4 of FIGURE 3.

In acocrdance with the present invention, means are provided to secure a portion of the hoses 33 and 40 against movement relative to compartment 38 and, in the preferred form of the present invention, these means include a generally V-shaped support 52. Support 52 is secured to wall 37 by means of a screw 53 which threadedly engages support 52. The two arms 54 and 55 of support 52, as best seen in FIGURE 4, are spaced from each other a distance slightly less than the sum of the outside diameters of hoses 33 and 40 to provide an interference fit between the hoses and the arms so that the hoses are firmly secured by support 52.

The major portions of hoses 33 and 40 are free to move relative to compartment 38, this major portion comprising all of the hoses between support 52 and connector 49. It should be noted that support 52 maintains those portions of hoses 33 and 40 which are secured to support 52 in an elevated relationship with wall 37 so that the major portions of hoses 33 and 40 are free to move therebelow.

The normal position of hoses 33 and 40 within compartment 38, as illustrated in FIGURE 2, is one of a large loop consuming most of compartment 38. Additionally, it is significant to note that the loop thus formed is substantially tangential to wall 45. Tangential, as used herein, is not confined to the precise geometric definition of that term since, as is obvious in FIGURE 2, hose 33 does not necessarily touch wall 45. The term "tangential" is intended to describe generally the relationship between the loop formed by hoses 33 and 40 and the wall 45 through which the hoses are withdrawn from compartment 38. As the description continues, this relationship will become more meaningful.

Figure 5:
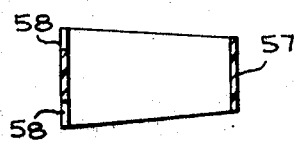
FIGURE 5 is a sectional view of the preferred form of another element of the present invention.

The hoses 33 and 40 are withdrawn from compartment 38 simply by pulling coupling 49 outwardly from member 47. This activity may continue until hoses 33 and 40 approach the condition illustrated in FIGURE 3, at which time the hoses themselves prevent further withdrawal. When the hoses approach the condition illustrated in FIGURE 3, an antikinking device 57 serves to avoid kinking of the hoses 33 and 40 which, if allowed to occur, would provide a substantial restriction against liquid flow through the hoses which in turn could create malfunction of dishwasher 10. Device 57 comprises, as best illustrated in FIGURE 5, a hollow cylindrical member having both ends gradually tapered toward one side. Slots 58 are provided to receive a wire or cord 59 which wraps around hose 40 to secure device 57 thereto. As can be seen by a comparison of FIGURE 2 and FIGURE 3, the device 57 moves relative to compartment 38 with the portion of hose 40 to which it is attached. Also, device 57 at the same time moves relative to the portion of hose 40 so that as hoses 33 and 40 reach the position illustrated in FIGURE 3, device 57 defines an arc about which hose 40 may bend without the occurrence of kinking of either of hoses 33 or 40.

Hoses 33 and 40 each has, when manufactured, a natural relaxed straight line position. In other words, hoses 33 and 40 are given no unusual relaxed configuration when manufactured. Thus, if hoses 33 and 40 were not confined within compartment 38 the loop illustrated in FIGURE 2 would tend to unwind at least to some extent with hoses 33 and 40 attempting to assume substantially a straight line. Accordingly, when hoses 33 and 40 are in the withdrawn position illustrated in FIGURE 3, which involves a rather tight loop, they have a tendency to unwind, due to their resiliency, and form a large loop such that in FIGURE 2. Because hoses 33 and 40 have a section which is substantially tangential to wall 45, with this section being relatively close to the suport 52, which secures the portion of the hoses against movement, the tendency of the hoses 33 and 40 is to straighten themselves out along wall 45. Thus, as the housewife attempts to reinsert the hoses into compartment 38, the hoses themselves assist due to their tendency to straighten out along wall 45. Of course, the hoses cannot completely straighten out because they contact the adjacent wall at the top of FIGURE 2; however, this tendency to straighten out greatly encourages the formation of the large loop illustrated in FIGURE 2.

In addition to positioning support 52 such that the hoses tend to align themselves with wall 45, guide means are provided to further facilitate insertion of the hoses into compartment 38. Guide means 60 is supported from wall 37 in a manner similar to support 52 and comprises a generally cylindrical post having its upper end flared outwardly to at least partially overlie hose 33. Guide means 60 serves a plurality of functions. It is adapted to be engaged by hose 33 as the hoses are initially inserted into compartment 38 to direct the hoses toward wall 45 before they engage the wall opposite wall 45 thus assuring that the loop formed will be a large loop consuming substantially all of compartment 38. Additionally, guide means 60 prevents hoses 33 and 40 from becoming entangled with valve 41. Also, the outwardly flared upper end of the guide means 60 maintains hoses 33 and 40 in the lower portion of compartment 38 to minimize interference between the movable major portions of hoses 33 and 40 and the relatively stationary portions adjacent support 52.

A stationary divider guide 61 is carried by portion 48 of member 47 and is disposed between hoses 33 and 40 to separate the hoses as they are withdrawn from, and reinserted into, compartment 38. Since hoses 33 and 40 lie in a substantially common plane, the radii of curvature of the two hoses is different so that as the hoses are withdrawn from, or inserted into, compartment 38, there is a relative movement between the hoses. The divider guide, by separating the hoses, minimizes the frictional forces created by the relative movement between the hoses and thus facilitates movement of the hoses into or out of compartment 38.

A piece of adhesive tape 56 is wrapped around both hoses 33 and 40 to facilitate assembly of the hoses into support 52. Also, during assembly of the hose storage system, the lengths of the major portions of hoses 33 and 40 are adjusted, relative to each other, so that the length of hose 40 is sufficiently less than the length of hose 33 to provide the clearance between these hoses as illustrated in FIGURE 2. This clearance minimizes the possibility that hose 33 and hose 40 will engage each other and create frictional forces therebetween which, as discussed above, would tend to retard insertion or removal of the hoses. Tape 56 serves to maintain the lengths of the major portions of hoses 33 and 40 in this desired relationship.

Although support 52 is shown in the preferred embodiment as being disposed on the opposite side of opening 46 than the major portion of the hoses, it should be understood that it would be within the spirit of the present invention to place support 52 adjacent wall 45 on the same side of opening 46 as the major portion of the hoses. For example, support 52 could be positioned in the general area of where wire 59 is now located. This would, of course, reduce the length of hoses 33 and 40 which could be withdrawn through opening 46, and that is the reason support 52 is positioned at the location illustrated in FIGURE 2 in the preferred form of the present invention; however, the loop formed by the hoses would still lie substantially tangential to wall 45 so that the benefit described above would exist with such modifications. The loop thus formed would not be a completely closed loop, i.e., the loop would extend from the point at which wire 59 is now located around to opening 46. Thus, the expression "loop" as used herein should not be construed as limited to a completely closed loop.

Thus, it can be seen that the present invention provides an improved relatively inexpensive hose storage system for a washing appliance which facilitates insertion of the hose into a storage chamber and particularly with respect to a horizontally disposed compartment wherein gravity does not assist in insertion. Moreover, the present invention provides inexpensive, simple means to minimize kinking of a washing appliance hose due to excessive withdrawal of the hose from its storage compartment.

Although many of the benefits of the present invention are derived from its use with a horizontally disposed storage chamber, it should be recognized that many aspects of the present invention are equally applicable to a vertically disposed hose storage chamber.

What I claim as new and desire to secure by Letters Patent of the United States is:

1. A hose storage system for a washing appliance comprising:

(a) a generally horizontally disposed compartment having at least one opening in at least one wall thereof, (b) at least one hose adapted to be at least partially inserted into and partially withdrawn from said compartment through said opening, and (c) means to secure a portion of said hose against movement relative to said compartment, (d) said hose having a major portion extending from said securing means to a terminal end which is free to move relative to said compartment, (e) said major portion forming a loop within said compartment, (f) said loop being substantially tangential to said one wall of said compartment when said hose is inserted into said compartment whereby the resiliency of said hose tends to urge said hose into a large loop within said compartment.

2. The invention of claim 1 further comprising a cylindrical member secured to said major portion for movement therewith to prevent kinking of said hose when said hose is withdrawn from said compartment.

3. The invention of claim 1 wherein said securing means comprises additional means to elevate the portion of said hose secured by said securing means with said major portion being disposed below said portion secured by said securing means.

4. The invention of claim 1 further comprising guide means within said compartment adapted to be engaged by said major portion as said hose is inserted into said compartment to guide said major portion into a predetermined location within said compartment.

5. The invention of claim 4 wherein said guide means comprises a generally cylindrical post having its upper end flared outwardly to at least partially overlie said major portion.

6. A hose storage system for a washing appliance comprising:

(a) a first hose, (b) a second hose, (c) a generally horizontally disposed compartment having at least one opening in at least one wall thereof, (d) each of said hoses adapted to be at least partially inserted into and partially withdrawn from said compartment through said opening, (e) means to secure a portion of each of said hoses against movement relative to said compartment, (f) said hoses being disposed side-by-side in a substantially horizontal plane, (g) said first hose having a major portion extending from said securing means to a terminal end which is free to move relative to said compartment, (h) said second hose having a major portion extending from said securing means to a terminal end which is free to move relative to said compartment, (i) said major portion of said first hose forming a loop within said compartment, (j) said major portion of said second hose forming a loop within said compartment, (k) each of said loops being substantially tangential to said one wall of said compartment when said hoses are inserted into said compartment whereby the resiliency of said hoses tends to urge said hoses into a large loop within said compartment, and (l) a stationary divider guide disposed adjacent said opening with said first hose disposed on one side thereof and said second hose disposed on the opposite side thereof.

7. The invention of claim 6 further comprising a cylindrical member secured to said major portion of one of said hoses for movement therewith to prevent kinking of said hoses when said hoses are withdrawn from said compartment.

8. The invention of claim 6 wherein said securing means comprises additional means to elevate the portions of said hoses secured by said securing means with said major portions being disposed below said portions secured by said securing means.

9. The invention of claim 6 further comprising guide means within said compartment adapted to be engaged by at least one of said major portions as said hoses are inserted into said compartment to guide said one of said major portions into a predetermined location within said compartment.

10. The invention of claim 9 wherein said guide means comprises a generally cylindrical post having its upper end flared outwardly to at least partially overlie at least one of said major portions.

11. A hose storage system for a washing appliance comprising:

(a) a first hose, (b) a second hose, (c) a compartment having at least one opening in at least one wall thereof, (d) each of said hoses adapted to be at least partially inserted into and partially withdrawn from said compartment through said opening, (e) means to secure a portion of each of said hoses against movement relative to said compartment, (f) said hoses being disposed side-by-side in a substantially the same plane, (g) said first hose having a major portion extending from said securing means to a terminal end which is free to move relative to said compartment, (h) said second hose having a major portion extending from said securing means to a terminal end which is free to move relative to said compartment, (i) said major portion of said first hose forming a loop within said compartment, (j) said major portion of said second hose forming a loop within said compartment, (k) each of said loops being substantially tangential to said one wall of said compartment when said hoses are inserted into said compartment whereby the resiliency of said hoses tends to urge said hoses into a large loop within said compartment, and (l) a cylindrical member secured to one of said major portions for movement therewith to prevent kinking of said hoses when said hoses are withdrawn from said compartment.

12. A hose storage system for a washing appliance comprising:

(a) a first hose, (b) a second hose, (c) a compartment having at least one opening in at least one wall thereof, (d) each of said hoses adapted to be at least partially inserted into and partially withdrawn from said compartment through said opening, (e) means to secure a portion of each of said hoses against movement relative to said compartment, (f) said hoses being disposed side-by-side in a substantially the same plane, (g) said first hose having a major portion extending from said securing means to a terminal end which is free to move relative to said compartment, (h) said second hose having a major portion extending from said securing means to a terminal end which is free to move relative to said compartment, (i) said major portion of said first hose forming a loop within said compartment, (j) said major portion of said second hose forming a loop within said compartment, (k) each of said loops being substantially tangential to said one wall of said compartment when said hoses are inserted into said compartment whereby the resiliency of said hoses tends to urge said hoses into a large loop within said compartment, and (1) a stationary divider guide disposed adjacent said opening with said first hose disposed on one side thereof and said second hose disposed on the opposite side thereof.

13. The invention of claim 12 further comprising a cylindrical member secured to one of said major portions for movement therewith to prevent kinking of said hoses when said hoses are withdrawn from said compartment.

14. In a hose system comprising at least one hose having a first portion secured against movement and a second portion in the form of a loop movable relative to said first portion, the invention comprising a generally cylindrical element secured to said second portion, positioned within said loop for movement both with and relative to said hose second portion.

References Cited
UNITED STATES PATENTS

| | | | |
|---|---|---|---|
| 2,118,294 | 5/1938 | Cox | 137—355.17 XR |
| 2,717,136 | 9/1955 | Greeson | 137—355.16 XR |
| 3,092,134 | 6/1963 | Allen et al. | 137—355.17 |
| 3,179,481 | 4/1965 | Jenkins. | |
| 3,183,927 | 5/1965 | Weese et al. | 137—355.19 |
| 3,190,307 | 6/1965 | De Vries | 137—355.17 |
| 3,213,877 | 10/1965 | May et al. | 137—355.16 |
| 3,225,974 | 12/1965 | Athas | 137—355.16 XR |
| 3,332,434 | 7/1967 | Stahmer | 137—355.17 |

SAMUEL SCOTT, Primary Examiner

U.S. Cl. X.R.

137—355.23